United States Patent Office 3,626,674
Patented Dec. 14, 1971

3,626,674
FLUID FILTERS
Donald Eric Blackmore, London, England, assignor to Westinghouse Brake and Signal Company, Limited
Filed Mar. 24, 1969, Ser. No. 809,826
Claims priority, application Great Britain, Apr. 11, 1968, 17,438/68
Int. Cl. B01d 46/04
U.S. Cl. 55—294                           4 Claims

ABSTRACT OF THE DISCLOSURE

A gas filter provided with a cleaning nozzle which reciprocates between a dividing means and a supply conduit has been inserted.

This invention relates to fluid filters.

The present invention provides a fluid filter having an inlet through which, in a filtering mode of operation of the filter, contaminated fluid can be fed to a filter-media therethrough to flow in a forward direction for the filtering of contamination out of the fluid and thence to an outlet for the thus filtered fluid, said outlet being, in a filter-media cleaning mode of operation of the filter, at least partially closable to flow therethrough of the filtered fluid by valve means which, in so-closing said outlet opens a passage for the supply of cleaning fluid through said outlet to the filter-media for flow therethrough in the reverse direction.

The contaminated fluid may be a dust-laden gas and the cleaning fluid may be a clean gas which may be the same gas as that of the dust-laden gas.

The outlet may be fully-closable by the valve means during the cleaning stage against flow therethrough of cleaned fluid.

The valve means may comprise a pair of valve flaps movable into engagement with corresponding side walls of the outlet to close the outlet against flow therethrough of the filtered fluid. The flaps may be so moved into engagement with the side walls solely by the pressure of the cleaning fluid or alternatively, means may be provided separately for moving the flaps so into engagement with the side walls. In this latter case, the flaps may be moved mechanically and may be moved by a finger forced between adjacent edges of the flaps at the position of the valve means in which filtered fluid is allowed to pass through the outlet. The outlet may be of substantial length as compared to its width and the side walls with which are engageable the flaps may be the side walls of the outlet which extend longitudinally thereof. Where the flaps are moved by a finger, this finger may be operable by a cam which may be rotatable.

The valve means may comprise a nozzle movable into engagement with corresponding side walls of the outlet to close the outlet against flow therethrough of the filtered fluid. The nozzle may be moved into such engagement by an actuator. The nozzle may be arranged to introduce the cleaning fluid directly into the outlet of the filter.

The cleaning fluid supplied to a fluid filter during its filter-media cleaning mode may be derived from the filtered fluid output of a further filter operated in its filtering mode.

The filter-media may be in the form of a bag the interior of which is in communication with the outlet.

Figures 1A, 1B:
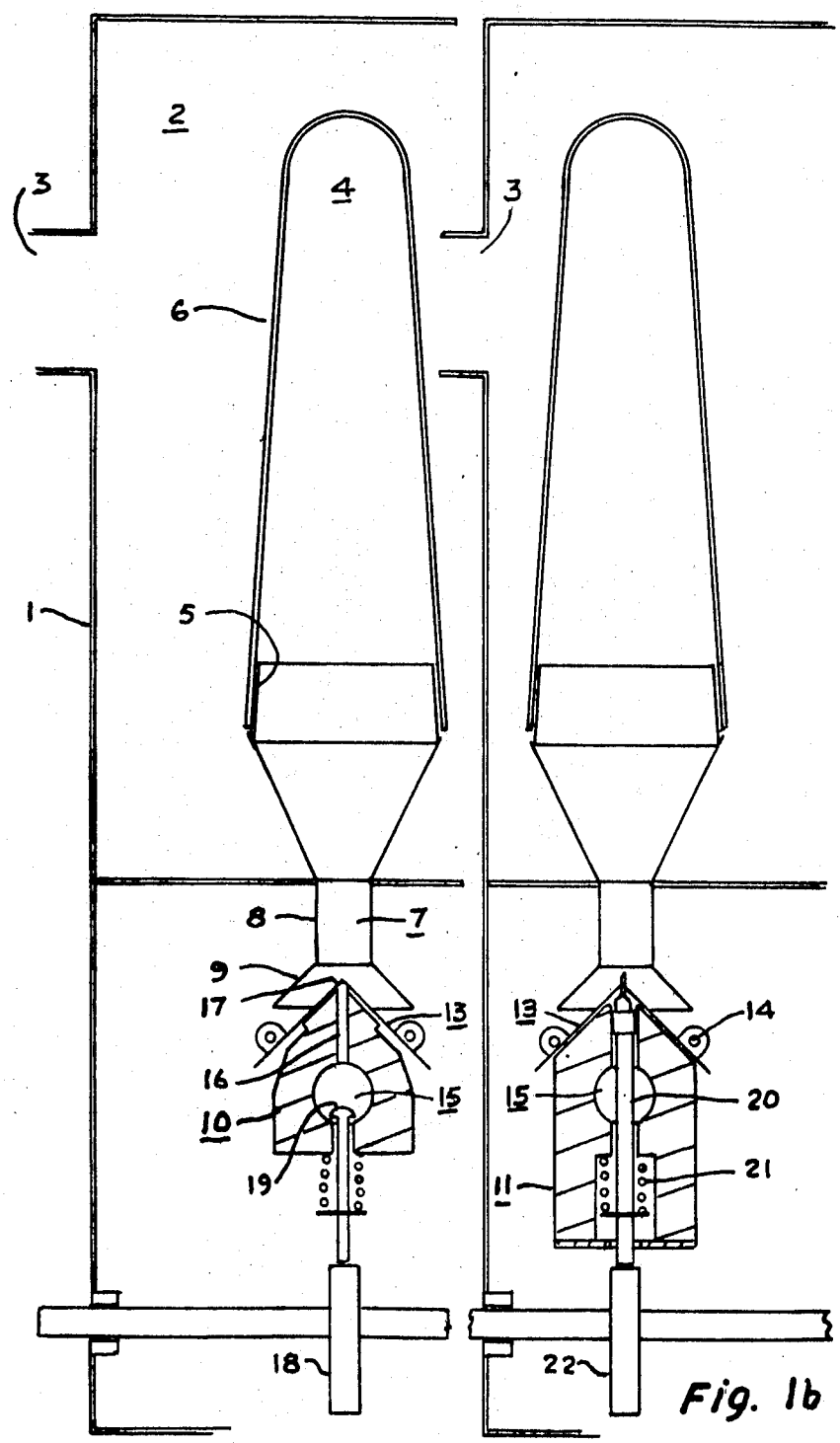
Figure 2:
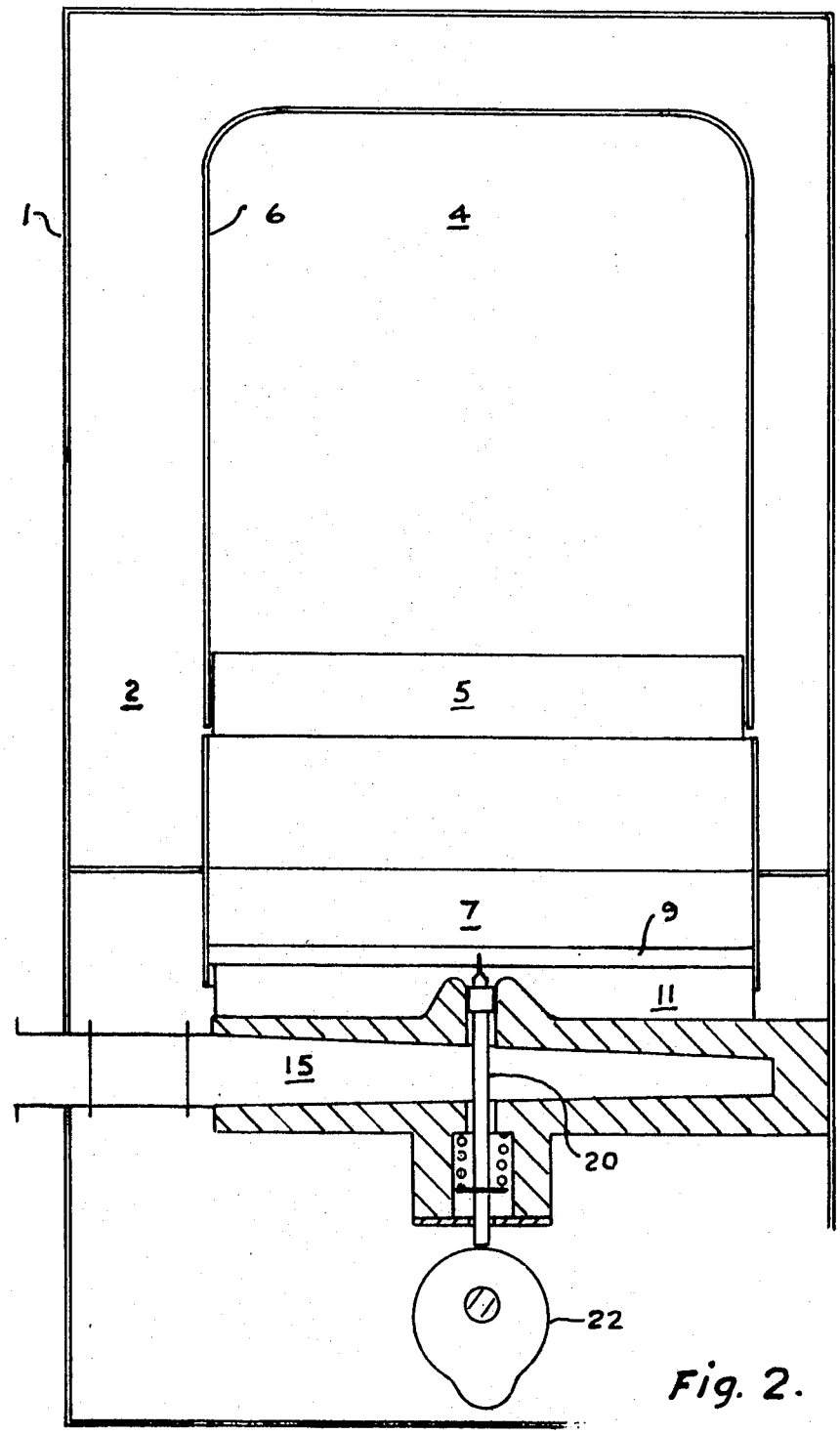
Figure 3:
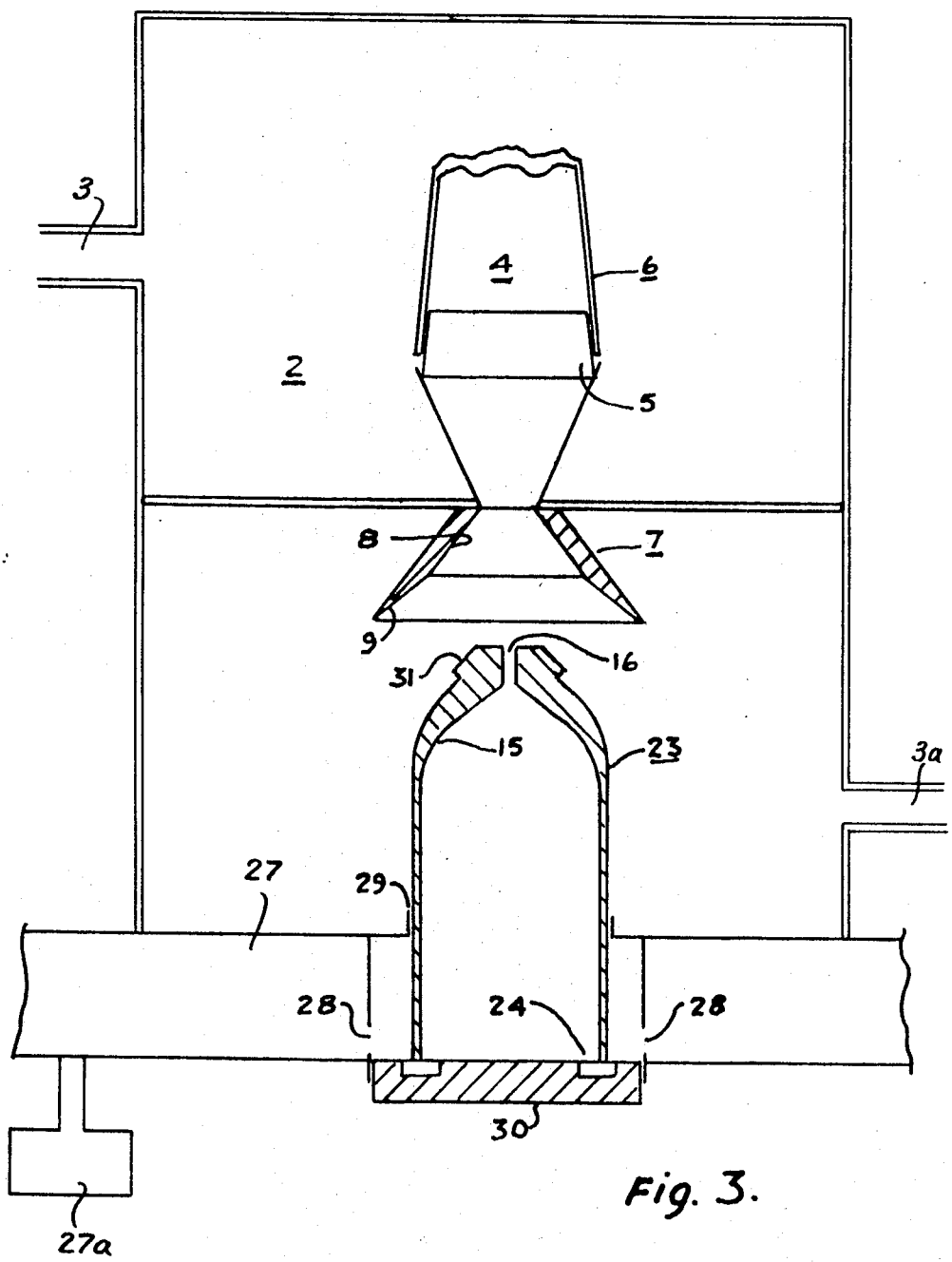
Figure 4:
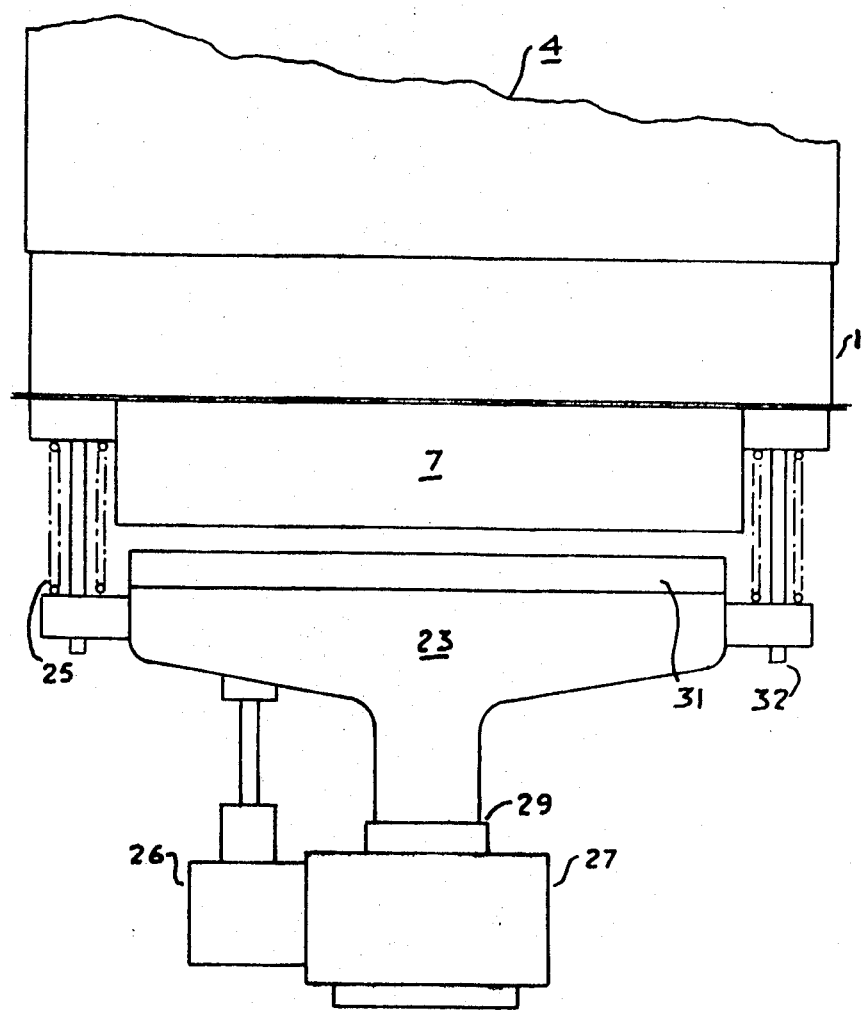

Embodiments of the present invention will now be described in greater detail, by way of example, with reference to the accompanying drawings of which:

FIGS. 1a and 1b are cross-sectional part-views of a filter showing alternative arrangements of valve means, FIG. 2 is a cross-sectional view at right-angles to that shown in FIG. 1b of the alternative valve means, FIG. 3 is a cross-sectional part-view of a further means, and FIG. 4 is an external view of the further valve means at right-angles to that shown in FIG. 3.

Referring to FIGS. 1a and 1b of the drawings, the filter comprises a casing 1 providing a chamber 2 into which opens an inlet 3 through which dust-laden gas can be fed to the chamber 2. In the chamber 2 is arranged a plurality (of which one is shown in FIGS. 1a and 1b) of filter assemblies 4 each comprising a rigid framework 5 over which is stretched a bag 6 of filter-media.

With the inside of each filter assembly communicates an outlet 7 which is of relatively great length as compared to its cross-section and which extends longitudinally transversely across the casing 1. Each outlet 7 consists of longitudinally extending sidewalls 8 whose lower ends, as viewed in the drawing, flare outwardly at 9.

The various outlets 7 are provided with valve means 10 and 11 respectively.

Dealing, firstly, with the valve means 10, the means here comprises a pair of flaps 13 extending longitudinally of the outlet 7 and each pivoted about an axis 14 also extending longitudinally of the outlet 7.

In the position of the valve means 10 as shown in the drawing, dust-laden gas can flow from the inlet 3 to the filter-media 6 and therethrough in a forward direction into the interior of the filter assembly 4 associated with the valve means 10. In flowing through the filter-media 6, the gas will, of course, be filtered (the dust previously carried thereby being retained by the filter-media 6) so that only filtered gas flows into the interior of the filter assembly 4. From this interior, the thus filtered gas flows outwardly through the outlet 7 being undisturbed in such flow by the flaps 13 being in their position as shown in the drawing.

It will be fully appreciated that in this filtering stage of operation of the filter, the filter-media 6 gradually has built up on it the dust carried by the dust-laden gas and such dust requires periodic removal if the efficiency of the filter is not to be inhibited.

The valve means 10 has extending longitudinally therethrough a conduit 15 extending radially upwardly (as viewed in the drawing) from which is a passage 16 also extending longitudinally of the valve means 10, which passage communicates at its lower end (as viewed in the drawing) with the conduit 15 and extends at its upper end (as viewed in the drawing) to adjacent the abutting lips 17 of the flap 13.

If a gas (which may be the same gas as is being filtered) is applied under pressure to the conduit 15, it will pass therefrom into the passage 16, when valve 19 is in the open position (as shown) controlled by cam 18, and its pressure will force the lips 17 of the flap 13 apart by causing the flaps 13 to be pivoted each on its respective axis 14. Provided the pressure of this cleaning gas is sufficiently high, the flaps 13 will be pivoted a sufficient amount to cause the lips 17 to engage the portion 9 of the respective sidewall 8. In so doing, the outlet 7 will now be closed against outward flow of filtered gas from the interior of the filter assembly 4 whilst, at the same time, in this filter-media-cleaning mode, the conduit 15 will be open to the interior of the filter assembly 4 where the pressure of the incoming cleaning gas will cause it to flow in the reverse direction through the filter-media 6 and thus "blow-off" the dust accumulated on the filter-media 6.

As described above in valve means 10 the flaps 13 are moved from their position as shown in the drawing solely by the pressure of the cleaning gas.

In the valve means 11 this is not so. The valve means 11 is still provided with the conduit 15 through which cleaning gas under pressure can be fed to the outlet 7 but it is not the pressure of the gas which is used to move the flaps 13; such movement is achieved mechanically.

Referring now to FIGS. 1 and 2 of the accompanying drawing, the valve means 11 incorporates a finger 20 the upper end (as viewed in the drawings) of which is tapered and the lower end of which is encircled by a compression spring 21 which acts resiliently to urge the finger 20 downwardly into engagement with a rotatable cam 22 (FIG. 2).

With the valve means 11, the filter-media-cleaning stage requires the rotation of the cam 22 from its position as shown in FIG. 2, to that in which the cam lifts the finger 20 to force apart the flaps 13 thus allowing the cleaning gas to flow from the conduit 15 into the interior of the respective filter assembly 4.

For the valve means 11, it is assumed that the pressure of the cleaning gas will be sufficiently high that complete closure of the outlet 7 is not necessary, movement of the flaps 13 to a partly open position being sufficient to throttle any flow of gas in the forward direction sufficient that such flow is overcome by the flow of the cleaning gas in the reverse direction.

However, it may be that the rate of flow of the filtered gas in the forward direction as compared to the rate of flow in the reverse direction may be such as to prevent adequate flow of cleaning gas in the reverse direction and, in this case, it will be necessary for the movement of the finger 20 to be sufficient completely to close the outlet 7. With such greater movement, the flaps 13 are caused, in the filter-media-cleaning mode to engage with the longitudinal side walls 8 of the outlet 7.

FIGS. 3 and 4 show a filter arrangement including a further valve means to control the flow of scavenging fluid. Similar reference numerals identify parts similar to those in FIGS. 1 and 2 and the general arrangement of the filters can be similar.

In FIG. 3 a nozzle 23 is shown mounted in a duct 27. In the drawing the entrance of the nozzle is closed by its abutment with a seal 24. The entrance to the nozzle is preferably circular in cross-section and the seal 24 can then be a ring of rubber or springy metal mounted in a plug 30 which is sealingly engaged with the duct 27. A further seal is formed between the nozzle and an aperture 29 in the duct 27 so that the nozzle can move vertically, as shown in the drawing, towards the outlet 7 of the filter assembly 4. The further seal may be an O-ring or a bellows of rubber or metal depending on the temperature and pressure conditions in a particular filter installation. The duct 27 carries the cleaning fluid under pressure from pressure source 27a and movement of nozzle 23 from its abutment with the seal 24 allows fluid to enter the nozzle, passing through ports 28 from the duct. The part of nozzle indicated at 15 is extended along an axis at right angles to the plane of FIG. 3 to form the T-shaped nozzle shown in FIG. 4 at 23. The outlet of the nozzle is a slit 16 extending along the top of this T-shape. Adjacent the slit 16 are formed surfaces 31 with the same slope as the inside portion 8 of outlet 7 of the filter assembly. Filtered fluid is removed via outlet 3a.

Duct 27 is fixed with respect to the casing 1 and an actuator 26 is positioned to move nozzle 23 with respect to the duct and filter assembly.

The nozzle 23 moves on guides 32 under the control of actuator 26 and springs 25.

In operation the cleaning fluid is supplied to duct 27 and when the filter assembly is to be cleaned of contamination by reverse flow the actuator 26 is operated to move the slit 16 of nozzle 23 toward the outlet 7 of the filter assembly. As soon as nozzle 23 moves off seal 24 the cleaning fluid flows through ports 28, up the nozzle and out the slit 16. The cleaning fluid pressure opposes the filtered fluid flow and can be adjusted either to reverse it before the surfaces 31 reach portion 8 or to only reverse the flow through the filter assembly 4 when the outlet for filtered fluid is closed by the abutment of surfaces 31 with the portion 8. When sufficient cleaning fluid flow has occurred the actuator is again operated, this time to return the nozzle to abutment with seal 24 to stop the flow of cleaning fluid.

The actuator may be electromagnetic, pneumatic or a mechanical linkage and may be situated remote from the position shown in FIG. 4 if the environment is adverse to siting on the duct 27. The nozzle in FIG. 4 is shown moving along straight guides to meet the filter outlet squarely. However, alternatively the nozzle may be pivoted at one end to swing into and out of engagement with the outlet. Although this means that the outlet for the filtered fluid is of varying cross-section along its length satisfactory filtering is obtained.

In the above descriptions reference has only been made to one filter assembly 4. In an actual installation a group of filter assemblies could be installed in single casing 1, with a common inlet 3 and individual outlets 7. The outlets would be sequentially supplied with cleaning fluid to remove contamination from one filter while the remainder continued in operation. The cleaning fluid may be obtained by diverting part of the filtered fluid flow from those filter assemblies still in the filtering mode.

Whilst, in the above described embodiments, the filter is specified as being one for the cleaning of dust-laden gas, clearly it is possible for the concept of the present invention to be used for the cleaning of other contaminated gases or, indeed, fluids generally.

Having thus described my invention, what I claim is:

1. A gas filter arrangement comprising a vessel, means dividing said vessel into a clean gas chamber and a contaminated gas chamber, said dividing means having an opening providing communication between said contaminated gas chamber and said clean gas chamber, an inlet in said vessel for introducing contaminated gas into said contaminated gas chamber, an outlet in said vessel for withdrawal of clean gas from said clean gas chamber, a filter surface having the form of an open ended container positioned in said contaminated gas chamber for forward fluid flow from said inlet through said filter surface to said outlet, the open mouth of said filter surface being secured around the opening in said dividing means, a conduit positioned across said clean gas chamber for supplying cleaning gas, a reciprocable nozzle mounted in said clean gas chamber having an open end and mounted in said supply conduit adjacent the opening in said dividing means, means mounting said nozzle for reciprocating movement between the dividing means and the supply conduit, actuating means reciprocating said nozzle from a position in the conduit in contact with sealing means preventing passage of cleaning gas through said nozzle to a position in flow connecting relation to the opening in the dividing means for closing off the opening in the dividing means to the outlet of the vessel and providing direct communication of cleaning gas from said cleaning gas supply conduit to the filter inner surface, and a clean gas pressure source connected to said supply conduit.

2. The gas filter arrangement of claim 1 wherein the base of the nozzle abuts a resilient portion on the inner wall of the supply conduit when not extended toward the opening in the dividing means.

3. The gas filter arrangement of claim 1 wherein surrounding the opening of said dividing means in said clean gas chamber is an outwardly tapering fluid filter outlet.

4. The gas filter arrangement of claim 3 wherein the fluid filter outlet is of rectangular cross-section and the surface of said nozzle is shaped to cooperate with the side walls of said fluid filter outlet parallel to the longer axis of said rectangular cross-section.

References Cited

UNITED STATES PATENTS

| 3,167,415 | 1/1965 | Edwards | 55—302 |
| 3,325,978 | 6/1967 | Rymer | 55—294 |
| 3,431,709 | 3/1969 | Kawanami | 55—302 |
| 3,436,899 | 4/1969 | Pausch | 55—302 |
| 3,394,532 | 7/1968 | Oetiker | 55—302 |
| 3,421,295 | 1/1969 | Swift et al. | 55—302 |
| 3,479,800 | 11/1969 | Brion et al. | 55—302 |
| 3,498,030 | 3/1970 | Wilki | 55—302 |

FOREIGN PATENTS 1,010,337  11/1965  Great Britain.

FRANK W. LUTTER, Primary Examiner

B. NOZICK, Assistant Examiner

U.S. Cl. X.R.

55—302, 341